United States Patent [19]
White

[11] Patent Number: 5,282,596
[45] Date of Patent: Feb. 1, 1994

[54] BIRD HOUSING MOUNTING APPARATUS AND METHOD

[76] Inventor: Lloyd N. White, 5134 Heatherbloom, Houston, Tex. 77045

[21] Appl. No.: 932,599

[22] Filed: Aug. 20, 1992

Related U.S. Application Data

[63] Continuation-in-part of Ser. No. 713,768, Jul. 22, 1991, abandoned.

[51] Int. Cl.⁵ .............................................. A47B 96/06
[52] U.S. Cl. ................................. 248/219.2; 248/121
[58] Field of Search .................... 248/219.2, 121, 176, 248/518, 519, 523, 231.9, 231.91, 911, 912, 357

[56] References Cited

U.S. PATENT DOCUMENTS

| | | | |
|---|---|---|---|
| 546,081 | 9/1895 | Reyer | 248/911 X |
| 2,701,839 | 2/1955 | Sherbinin | 248/219.2 |
| 2,724,048 | 11/1955 | Sherbinin | 248/219.2 X |
| 2,854,824 | 10/1958 | Curry | 248/231.9 |
| 2,905,445 | 9/1959 | Blum | 248/219.2 X |
| 2,982,982 | 5/1961 | Swift | 248/912 X |
| 3,542,323 | 11/1970 | Arnold | 248/911 X |
| 3,721,463 | 3/1973 | Attwood | 248/219.2 X |
| 4,074,941 | 2/1978 | Jablonski | 248/219.2 X |
| 4,716,674 | 1/1988 | Kammeraad | 248/231.9 X |
| 4,896,416 | 1/1990 | Cranko | 248/231.9 X |

*Primary Examiner*—J. Franklin Foss
*Attorney, Agent, or Firm*—Browning, Bushman, Anderson & Brookhart

[57] ABSTRACT

The present invention provides method and apparatus for mounting bird housings on a generally vertically oriented tubular member. An upper centralizer is mounted below a plate section which secures to the bird housing. The upper centralizer positions the mounting assembly within the tubular member. A lower centralizer or tension element secures the assembly into the tubular member but allows ready removal of the bird housing and attached mounting assembly.

18 Claims, 2 Drawing Sheets

BIRD HOUSING MOUNTING APPARATUS AND METHOD

This is a continuation in part of U..S. application Ser. No. 07/713,768 filed on Jul. 22, 1991, now abandoned.

BACKGROUND OF THE INVENTION

1. Field of the Invention

The present invention relates generally to a bird housing apparatus and method. More specifically, the present invention is directed to a new, novel apparatus and method for mounting a bird housing including pre-adjusted tensioning means for securing the same.

2. Description of the Background

It has been estimated that over 1,000,000 bird housings of various types are used throughout the United States. These bird housings include the typical bird houses and bird feeders. They also include assorted so called "whirley-jigs" which are devices employing wind power to enable some type of movement—e.g. a man cutting wood.

Many of these bird housings are affixed on the top of vertically oriented poles. Such mounting provides protection for the birds and their nests from earth bound predators. However, such mounting entails considerable difficulty for removal of the bird housing for cleaning or maintenance. Since one end of the poles is typically permanently affixed to the ground, it becomes necessary to use a ladder to reach the top of the pole. The presently available mounting devices are awkward to work with by a person balancing on top of a ladder. Presently available mountings include a sleeve threaded to the top of the pole or secured with some type of through bolt.

The poles are most often tubular and are made of either steel or PVC material. There are about three different size poles which are most often used. To effect use of the threaded mounting, it is necessary to obtain a pole with threads to match the sleeve. This is sometimes difficult. The threads may be damaged upon installation of the bird house. Over time, the threads may also become difficult to turn due to corrosion, rust, etc. Therefore, both installation and removal is often difficult and time consuming.

The mountings which have a through bolt, allen screws, etc. for securing a sleeve to the pole also have to be selected to match the pole diameter. If the pole is made of steel, it can be difficult to drill holes for the through bolt.

The mountings described above are both difficult to install and remove. It is desirable to have a single mounting apparatus or kit which will fit to most presently used poles. It is also desirable that they are mounted and removed simply and easily within seconds. Those skilled in the art have long sought and will appreciate the novel features of the present invention which solves these and other problems.

SUMMARY OF THE INVENTION

The present invention is directed to an improved bird housing mounting apparatus and method. This method and invention is generally for use with vertically oriented tubular members on top of which is disposed the bird housing. The present invention includes means for connecting to each of the three most common size diameter poles. These three sizes are almost always used for pole mounting bird housings. The present invention includes a base plate which is affixed to the bird housing. A straight rod attaches to the base plate. Along the straight rod, adjacent the base plate, a centralizer is disposed. A pre-adjusted tension element is also on this straight rod.

After affixing the bird housing to the base plate, straight rod, centralizer, and pre-adjusted tension element, the assembly is inserted into upper end of the tubular member. The pre-adjusted tension element presses against the inner wall of the tubular member at a relatively constant pre-determined amount. This tension limits movement of the assembly. However, the tension is pre-adjusted to an amount which allows for relatively easy insertion and removal. The tension is typically set so that a force in the range of from approximately 2 to 15 pounds is necessary to remove or insert the bird house and assembly. Since the assembly and bird house are typically relatively light, the overall force required to remove the bird house may be easily applied even when a person is on a ladder. On the other hand, the Applicant has observed that the bird housing is mounted in this manner with sufficient force so that the bird housing will remain in place even during a hurricane.

One embodiment of the present invention includes tension elements which are more easily removed by first rotating and pulling upwardly on the mounting assembly and/or the bird housing. Such rotation and upward pulling breaks the grip of the tension element and allows for a reduced force to remove the bird housing and installation assembly.

BRIEF DESCRIPTION OF THE DRAWINGS

Other features and intended advantages of the present invention will be readily apparent by the references to the following detailed description in connection with the accompanying drawings, wherein.

While the invention will be described in connection with the presently preferred embodiment, it will be understood that it is not intended to limit the invention to this embodiment. On the contrary, it is intended to cover all alternatives, modifications, and equivalents as may be included in the spirit of the invention.

DETAILED DESCRIPTION OF THE PREFERRED EMBODIMENT(S)

The present invention provides an improved method and apparatus for quickly and easily mounting and removing a bird housing on a tubular member.

Figure 2:
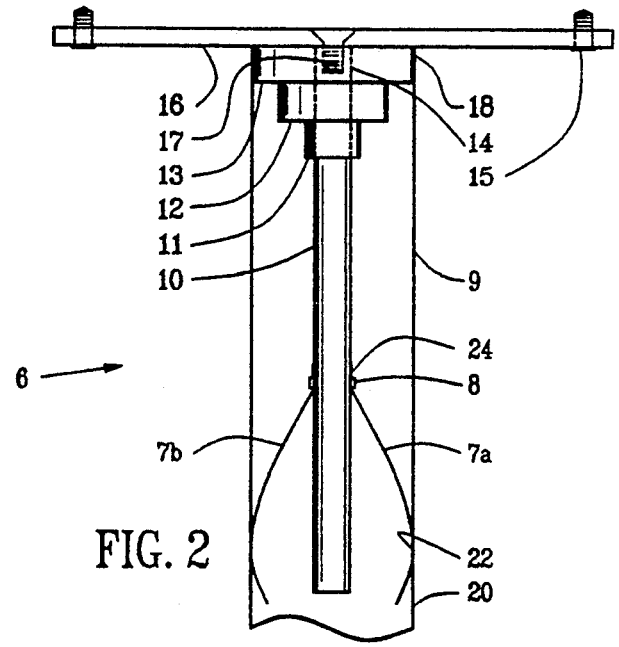
FIG. 2 is an elevational view, partially in section, of the bird housing mounting of FIG. 1 in greater detail.
Figure 1:
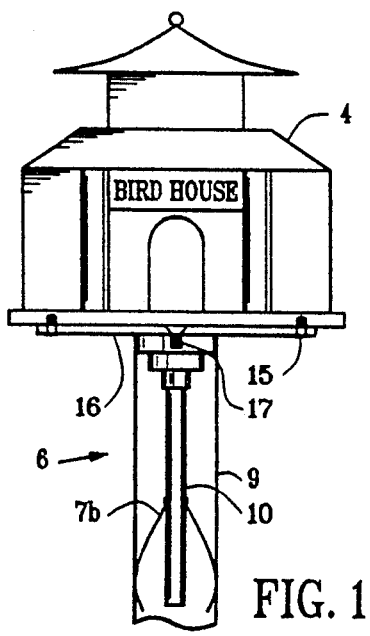
FIG. 1 is an elevational view, partially in section, of a bird housing mounting in accord with the present invention.

Referring to FIG. 1, there is shown an overall view of bird housing 4 mounted on tubular member 9 using assembly 6. Assembly 6 is shown in greater detail in FIG. 2. Bird housing 4 is shown mounted at the upper portion 18 of tubular member 9. The other end 20 of tubular member 9 is fixed with respect to the earth. Typically tubular member 9 will be driven or cemented into the earth so that tubular member 9 is effectively permanently secured in position. By the term "bird housing", it is understood that this may be a bird house, bird feeder, whirley-jig, or other type of housing used for birds.

Centralizer discs 11, 12, and 13 may be separate removable discs or may be bonded into a single unit. If discs 11, 12, and 13 are bonded together, then a smaller diameter tubular member 9 may result in discs 13 and/or 16 extending past upper portion 18 of tubular member 9 after installation of assembly 6. In this case, the discs which extend past upper portion 18 may rest on tubular member 9 to support bird housing 4. Straight rod 10 is centralized within tubular member 9 by centralizer discs 11, 12, and 13. The inventor has observed that almost invariably tubular member 9 is chosen to be one of three sizes—¾ in., 1 in., or 1½ in. The outer diameters of 11, 12, and 13, respectively, are selected to match to these common sizes. They may be approximately 1/16 inch larger than the internal diameter to provide extra force to hold mounting assembly 6 in place. In the present embodiment, tubular member 9 has an inner diameter which mates to the outer diameter of centralizer disc 13. If tubular member 9 has a smaller diameter, then it will almost invariably match the outer diameter of either disc 11 or 12. In this way, the present invention is adaptable to the various sizes of tubular member 9 which are typically used for purposes of mounting bird housing 4.

A bird house such as bird housing 4 is shown connected to base plate 16 by screws 15. The attachment may also be made with nails, glue, etc. The base plate 16 is generally of a substantially greater diameter than tubular member 9 to provide support for bird housing 4. This larger diameter base plate 16 also provides a solid stop to rest against the upper end 18 of tubular member 9. Base plate 16 is typically formed of metal such as steel.

Since tubular member 9 is generally vertically oriented with respect to the earth, components of the present invention may be conveniently described in terms such as "upper", "lower", and "vertical". This framework of description is made without any intent to limit the present invention. Rather, it is believed this framework of description will facilitate understanding of the present invention.

The upper portion 14 of substantially straight rod 10 may connect to plate 16 with screw 17 or by other means. Upper portion 14 is shown as extending through centralizers 11, 12, and 13. Upper portion 14 may also have a threaded end and screw into a mating component of baseplate 16. Such an arrangement will be shown when discussing alternative embodiment 30 of the present invention. Upper portion 14 may be connected to centralizers 11, 12, 13, and plate 16 by other means such as threads or additional screws.

Springs 7a and 7b are used to apply a force against the inner wall of tubular member 9. In a preferred embodiment, spring 7a and 7b include an arcuate portion such as portion 22 which presses against the interior wall of tubular member 9. This pressure is designed to prevent movement of springs 7a and 7b as well as straight rod 10. The pressure is maintained constant but can be preadjusted to the desired pressure by bending spring 7a and 7b outwardly or inwardly. It is generally desirable that the pressure exerted by the springs be approximately equal to prevent tilting of assembly 6. Springs 7a and 7b include a base portion 24 which is fixed to rod 10 by nuts 8. In a preferred embodiment, two horizontal through bolts (not shown) with two mating nuts per spring are used to prevent rotation of spring 7a or 7b.

The through bolts may be spaced vertically with respect to each other. Alternatively or additionally, rod 10 may include rectangular sided recesses (not shown) into which base portion 24 fits to prevent rotation.

Spring 7a and 7b may be shaped differently than shown and still effect the required pressure against the inner wall of tubular member 9. For instance, arcuate section 22 may be more square or each spring may end at the point where arcuate section 22 is located. Alternatively spring 7a and 7b may extend substantially past arcuate portion 22. Springs 7a and 7b may even return to rod 10 (not shown) and be affixed thereto in some manner, such as by another set of vertically spaced bolts, screws, etc., so as to provide adjustment. While it is desirable to have at least two springs, three or more springs may be used depending on the size of tubular member 9 and the size of the springs. The springs are customary disposed opposite each other or 180 degrees apart around rod 10. Generally it is desirable to adjust the spring tension so an upwardly directed force approximately 2-15 pounds greater than the weight of the assembly plus bird house may be used to remove assembly 6 plus bird housing 4. Typically the spring pressure applied against the interior wall of tubular member 9 will be in the range of approximately 8-10 ounces per spring although a broader range from 5-15 ounces is also easy to achieve.

Figure 3:
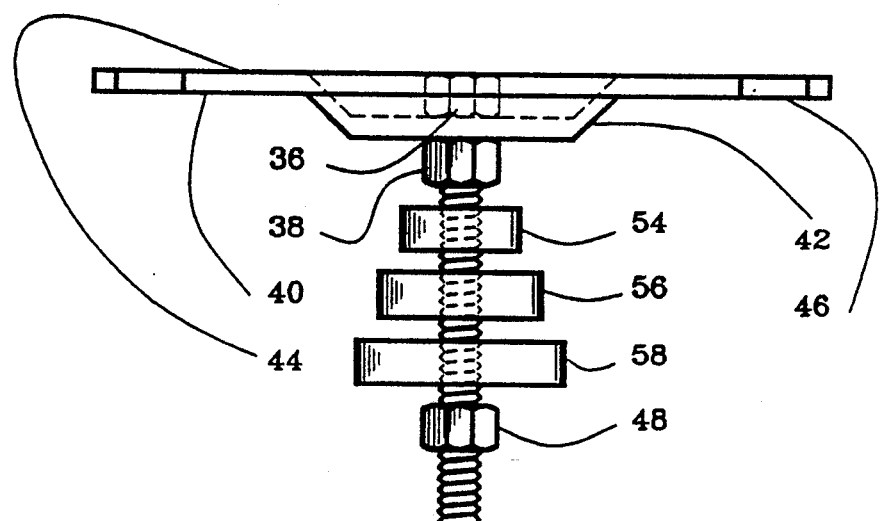
FIG. 3 is an elevational view, partially in section, of an alternative bird housing mounting in accord with the present invention.

FIG. 3 discloses an alternative preferred embodiment mounting assembly 30. Straight rod 32 includes thread 34 over its length in a preferred embodiment. The upper end of rod 32 attaches to plate 40 with nut 36. Plate 40 carries housing 42 in which nut 36 is affixed. This arrangement leaves flat surface 44 exposed for mounting to a bird housing such as bird housing 4. Holes 46 may be used with wood screws or nails to mount plate 40 against bird housing 4. Nuts 38 and 48 as well as nuts 50 and 52 are used to position and hold generally elastomeric upper centralizers 54, 56, or 58 and lower centralizers 60, 62, or 64 along rod 10. Only one upper and lower centralizer is actually used depending on the size of the tubular member in which assembly 30 is to be mounted. The remaining centralizers may be removed as desired. Assembly 30 with an attached bird housing 4 is pushed into a tubular member for mounting. Elastomeric centralizers grip against the interior side of the tubular member in which it is disposed. Generally the elastomeric centralizers are cut to be approximately 1/16 inch larger than the inside diameter of tubular member 9. Rotation of assembly 30 fixes the assembly within the tubular member by increasing the tension of the elastomeric centralizers against the interior wall of the tubular member. This is because rotation tends to flatten the centralizer, as compared to pushing the centralizer into the tubular member 9 which causes it to adopt a slightly conical shape. Since it tends to flatten out, the elastomeric centralizer thereby increases the tension applied against the interior wall. Rotation of the assembly 30 while pulling on assembly 30 reduces the tension created by the initial rotation, in a reverse manner, and allows for removal of the assembly. The centralizers need to be slightly oversize with respect to size of the tubular member for effecting greater and lesser tensioning through rotation of assembly 30. This same technique may also be applicable to upper centralizers 11, 12, and 13 if desirable.

Variation in tensioning can be effected by varying the thickness, flexibility, and diameter of the centralizers. By choosing some specific centralizer for a specific tubular member the tension is pre-adjusted. Generally assembly 30 requires in the approximate range of from 5-15 pounds over the weight of bird housing 4 and assembly 30 for removal prior to an initial rotation and upward pull which substantially lower the required removal force. The upward pull could be adjusted somewhat higher, to approximately 20 pounds, if this was desirable.

The foregoing description of the invention has been directed in primary part to particular, preferred embodiments in accordance with the requirements of the patent statutes and for purposes of illustration. It will be apparent, however, to those skilled in the art that many modifications and changes in the specifically described embodiments may be made without departing from the scope and spirit of the invention. Therefore, the invention is not restricted to the preferred embodiment illustrated but covers all modifications which may fall within the scope of the following claims.

I claim:

1. An apparatus for removably mounting a bird housing, comprising:
   a substantially vertically oriented tubular member, said tubular member having a lower end and a distal end and having an internal wall, said lower end being fixed with respect to the earth;
   a base plate having an outer dimension larger than the inside diameter of said vertically oriented tubular member, said base plate including means for securing said base plate to said bird housing;
   a substantially straight rod secured to said base plate, said rod extending from said base plate into said distal end of said vertically oriented tubular member, said straight rod having an upper end and a lower end;
   an upper centralizer affixed to said upper end of said straight rod for securing said upper end of said straight rod within said tubular member; and
   a pre-adjusted lower tension element affixed to said lower end of said straight rod for securing said straight rod within said tubular member, said tension element applying a pre-adjusted tension against said internal wall of said vertically oriented tubular member, said pre-adjusted tension being controlled to prevent movement of said straight rod with respect to said vertically oriented tubular member until a vertically upward force is applied to said straight rod which has a magnitude approximately in the range of from 2 to 15 pounds over the weight of the assembly comprising said bird housing, said base plate, said straight rod, said upper centralizing disc and said lower tension element.

2. The apparatus of claim 1, wherein said upper centralizer further comprises:
   a substantially elastomeric disc with an outside diameter slightly larger than the inside diameter of said vertically oriented tubular member.

3. The apparatus of claim wherein said upper centralizer further comprises:
   at least two discs axially stacked upon each other so there is an upper and lower disc, the upper disc has a larger diameter than said lower disc, the variation in diameter of said discs allowing said centralizer to mate to a corresponding internal diameter of said vertically oriented tubular member.

4. The apparatus of claim 1, wherein said pre-adjusted lower tension element further comprises:
   at least two leaf springs, each of said leaf springs having an arcuate portion thereof which is in engagement with said inner wall of said vertically oriented tubular member.

5. The apparatus of claim 4, further comprising:
   means for securing one end of each of said leaf springs to said straight rod, said leaf springs being positioned at the approximate same axial position with respect to each other.

6. The apparatus of claim 5, wherein:
   each of two of said leaf springs are disposed approximately 180° from each other around the circumference of said straight rod.

7. The apparatus of claim 1, wherein:
   said upper centralizer is a pre-adjusted tension element which co-operates with said lower pre-adjusted tension element.

8. The apparatus of claim 1, further comprising:
   threading disposed substantially over the length of said straight rod, said straight rod being secured to said base plate with at least one nut which mates to said threading, said upper centralizer and said lower pre-adjusted tension element being axially positionable along the length of said straight rod, at least two rotatable nuts threadably connected to said straight rod for selectively affixing said upper centralizer and said lower pre-adjusted tension element to said straight rod.

9. A method for removeably mounting a bird housing, comprising:
   orienting a tubular member in a substantially vertical direction whereby an upper end of said tubular member is pointing substantially upwardly with respect to the earth;
   fixing the lower end of said vertically oriented tubular member with respect to the earth;
   attaching an installation assembly to said bird housing, said installation assembly being extendable into said tubular member;
   securing said bird housing to the upper end of said tubular member by inserting at least part of said installation assembly into said upper end of said vertically oriented tubular member;
   preventing upward movement with respect to said tubular member of said bird housing and said installation assembly up to an upwardly force acting on said installation assembly of approximately from 2 to 15 pounds greater than the weight of said installation assembly plus said bird housing, said bird housing and said installation assembly being movable if a greater upwardly force is applied.

10. The method of claim 9, including:
    removing said bird housing from said tubular member by applying an upwardly directed force to said installation assembly approximately from 2-15 pounds greater than the weight of said installation assembly plus said bird housing.

11. The method of claim 9, including:
    rotating said bird housing prior to removal to decrease the removal force required to lift said assembly from said tubular member.

12. The method of claim 9, including:
    securing a straight rod to said base plate,
    mounting a centralizer to said straight rod proximate said base plate, and
    mounting a pre-adjusted tension element adjacent an end of said straight rod distal to said base plate.

13. The method of claim 9, including:

centralizing an upper portion of said installation assembly within said tubular member.

14. The method of claim 9, wherein said step of preventing upward movement includes:
applying a restraining force against an internal wall of said tubular member with a leaf spring.

15. The method of claim 9, wherein said step of preventing upward movement includes:
applying a restraining force against an internal wall of said tubular member with a compressed elastomeric disc.

16. The method of claim 9, wherein said step of preventing upward movement includes;
applying a restraining force against an internal wall of said tubular member with upper and lower compressed elastomeric discs having an outside diameter slightly larger than the inside diameter of said tubular member.

17. A method for removeably mounting a bird housing, comprising:
orienting a tubular member in a substantially vertical direction whereby an upper end of said tubular member is pointing substantially upwardly with respect to the earth;
fixing the lower end of said vertically oriented tubular member with respect to the earth;
attaching an installation assembly to said bird housing, said installation assembly being extendable into said tubular member; and
inserting at least part of said installation assembly into said upper end of said vertically oriented tubular member; and
rotating said assembly to secure said bird housing to the upper end of said tubular member so that a force in the range of from 2-20 pounds is required to remove said assembly.

18. The method of claim 17, including the step of:
rotating and pulling said assembly in an upwardly direction for reducing said force required to remove said bird housing from said tubular member.

* * * * *

UNITED STATES PATENT AND TRADEMARK OFFICE
CERTIFICATE OF CORRECTION

PATENT NO. : 5,282,596
DATED : February 1, 1994
INVENTOR(S) : Lloyd N. White

It is certified that error appears in the above-indentified patent and that said Letters Patent is hereby corrected as shown below:

In Col. 5, line 59, insert --1,-- after "claim".

Signed and Sealed this

Thirty-first Day of May, 1994

Attest:

BRUCE LEHMAN

Attesting Officer     Commissioner of Patents and Trademarks